United States Patent
Orimoto et al.

(10) Patent No.: US 7,667,768 B2
(45) Date of Patent: *Feb. 23, 2010

(54) IMAGE-CAPTURING APPARATUS HAVING MULTIPLE DETACHABLY CONNECTABLE IMAGE CAPTURING UNITS

(75) Inventors: Masaaki Orimoto, Asaka (JP); Takeshi Misawa, Asaka (JP); Akihisa Yamazaki, Asaka (JP); Takashi Yano, Asaka (JP); Kimiaki Nakada, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 186 days.

This patent is subject to a terminal disclaimer.

(21) Appl. No.: 11/497,368

(22) Filed: Aug. 2, 2006

(65) Prior Publication Data

US 2006/0268159 A1 Nov. 30, 2006

Related U.S. Application Data

(62) Division of application No. 09/325,431, filed on Jun. 4, 1999, now Pat. No. 7,102,686.

(30) Foreign Application Priority Data

Jun. 5, 1998 (JP) ................................. 10-158042

(51) Int. Cl.
*H04N 5/225* (2006.01)
(52) U.S. Cl. ..................................... 348/373; 348/375
(58) Field of Classification Search ......... 348/373–375, 348/42, 231.7
See application file for complete search history.

(56) References Cited

U.S. PATENT DOCUMENTS

| | | | |
|---|---|---|---|
| 4,148,072 | A | 4/1979 | Vockenhuber et al. |
| 4,427,280 | A | 1/1984 | Iwashita et al. |
| 4,488,794 | A | 12/1984 | Dolgow et al. |
| 4,920,371 | A | 4/1990 | Kaneko et al. |
| 5,329,325 | A | 7/1994 | McClellan et al. |
| 5,436,660 | A | 7/1995 | Sakamoto et al. |
| 5,754,227 | A | 5/1998 | Fukuoka et al. |

(Continued)

FOREIGN PATENT DOCUMENTS

JP 64007792 A 1/1989

(Continued)

*Primary Examiner*—Tuan Ho
(74) *Attorney, Agent, or Firm*—Birch, Stewart, Kolasch & Birch, LLP (57) ABSTRACT

An image-capturing apparatus is capable of capturing a three-dimensional image and a high quality panoramic image as the need arises, and is portable if it is used as a single lens camera that captures a normal two-dimensional image. A second image-capturing unit having an image-capturing optical system is detachably connected to a first image-capturing unit, which is capable of functioning as an image-capturing apparatus by itself, through joints and a connector. The second image-capturing unit can extensively connect to other units, which have the similar connecting structure. Information is transmitted between the units through a slot for an external storage device. There is provided a means for adjusting the positions of images captured by the second and subsequent image-capturing units with respect to an image captured by the first image-capturing unit. In synchronism with release signals from the first image-capturing unit, the other units are driven to capture the images at the same time or continuously.

60 Claims, 3 Drawing Sheets

U.S. PATENT DOCUMENTS

| | | |
|---|---|---|
| 5,864,360 A | 1/1999 | Okauchi et al. |
| 5,990,937 A | 11/1999 | Masayoshi et al. |
| 6,151,067 A | 11/2000 | Suemoto et al. |
| 6,188,431 B1 | 2/2001 | Oie et al. |
| 6,441,854 B2 | 8/2002 | Fellegara et al. |
| 6,549,650 B1 | 4/2003 | Ishikawa et al. |
| 6,864,911 B1 | 3/2005 | Zhang et al. |

FOREIGN PATENT DOCUMENTS

| | | |
|---|---|---|
| JP | 64-62974 | 3/1989 |
| JP | 1-246989 | 10/1989 |
| JP | 3-102341 A | 4/1991 |
| JP | 3-142347 | 6/1991 |
| JP | 3-142437 A | 6/1991 |
| JP | 3-142473 A | 6/1991 |
| JP | 4-24738 U | 2/1992 |
| JP | 5-95497 | 4/1993 |
| JP | 6273172 | 9/1994 |
| JP | 6-339052 A | 12/1994 |
| JP | 7-95467 A | 4/1995 |
| JP | 8317424 | 11/1996 |
| JP | 8317425 | 11/1996 |
| JP | 9-18895 A | 1/1997 |

IMAGE-CAPTURING APPARATUS HAVING MULTIPLE DETACHABLY CONNECTABLE IMAGE CAPTURING UNITS

This application is a Divisional of application Ser. No. 09/325,431, filed on Jun. 4, 1999, now U.S. Pat No. 7,102,686, the entire contents of which are hereby incorporated by reference and for which priority is claimed under 35 U.S.C. § 120.

BACKGROUND OF THE INVENTION

1. Field of the Invention

The present invention relates generally to an image-capturing apparatus, and more particularly to a portable image-capturing apparatus that is capable of capturing a three-dimensional image and a panoramic image.

2. Description of Related Art

There has been proposed a variety of apparatuses, which capture a three-dimensional image with two optical systems provided in one camera (Japanese Patent Provisional Publication Nos. 6-273172 and 8-317424). There has also been proposed a method for selectively capturing a three-dimensional image and a normal two-dimensional image with one camera (Japanese Patent Provisional Publication No. 8-317425).

The above-mentioned conventional apparatuses require that two image-capturing optical systems should be loaded in the body of the camera, and thus, the camera is large as a whole. When capturing only a normal two-dimensional image, the camera is not portable and is difficult to handle.

There has also been proposed an adapter that guides a right-eye image and a left-eye image into one optical path. This adapter, however, divides effective pixels of an imaging device into two areas, and it is therefore impossible to achieve satisfactory image quality.

SUMMARY OF THE INVENTION

In view of the foregoing, it is an object of the present invention to provide an image-capturing apparatus that is as portable as the conventional camera when capturing a normal two-dimensional image, and that is capable of capturing a three-dimensional image and a high-quality panoramic image as need arises.

To achieve the above-mentioned object, the present invention is directed to an image-capturing apparatus, comprising: a first image-capturing unit having a first image-capturing optical system; and a second image-capturing unit having a second image-capturing optical system, the second image-capturing unit being detachably connected to the first image-capturing unit.

According to the present invention, the second image-capturing unit is detachably connected to the first image-capturing unit, which functions as an image-capturing apparatus by itself. In the case of the normal image-capturing, the second image-capturing unit is detached from the first image-capturing unit, and only the first image-capturing unit is used. To capture the three-dimensional image and the panoramic image, the second image-capturing unit is connected to the first image-capturing unit to construct a multiple lens camera.

As described above, the image-capturing units are modularized so as to freely switch the modes of the optical systems between a single lens mode and a multiple lens mode according to the purposes and conditions. The image-capturing apparatus is portable as the normal single lens camera, and it may also be used as the multi-lens camera by connecting the image-capturing units to increase the functions. This eliminates the waste in the structure of the image-capturing apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
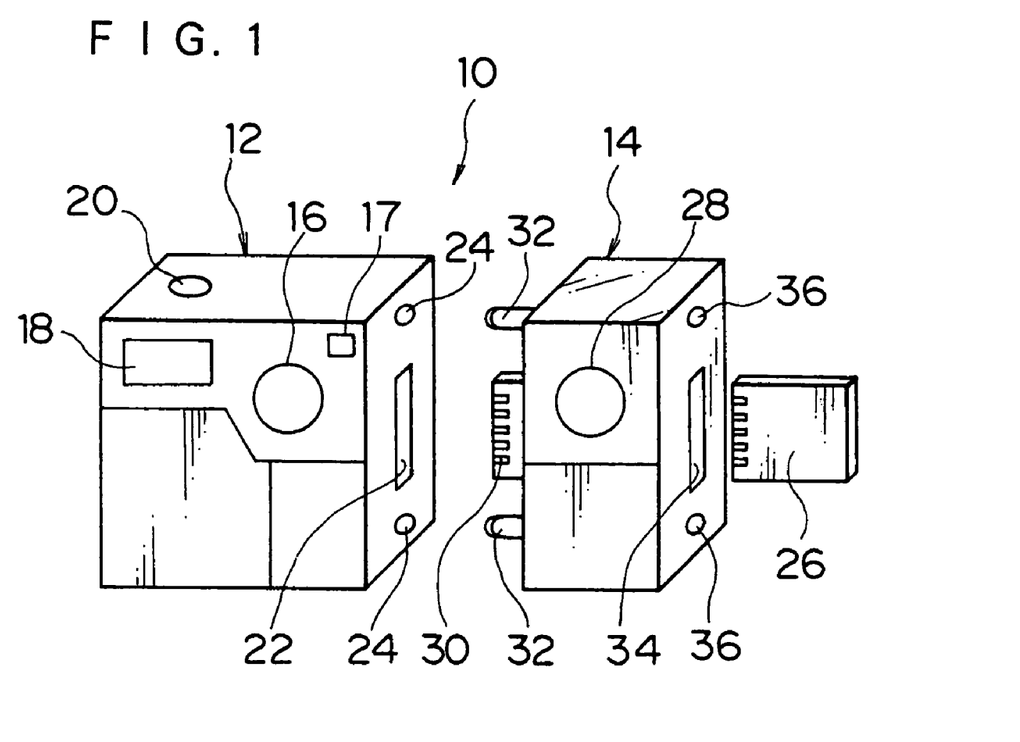
FIG. 1 is a perspective view showing the structure of an image-capturing apparatus according to a preferred embodiment of the present invention.

FIG. 1 shows an image-capturing apparatus according to a preferred embodiment of the present invention. The image-capturing apparatus 10 comprises a first image-capturing unit (a main camera) 12, which functions as a camera by itself; and a second image-capturing unit 14, which is capable of detachably connecting to the first image-capturing unit 12. A taking lens 16, a finder window 17 and an electronic flash 18 are provided at the front of a body of the first image-capturing unit 12. A shutter release button 20 is arranged at the top of the body. A charge coupled device (CCD) (not shown) is arranged behind the taking lens 16. Image light is formed on a light receiving surface of the CCD through the taking lens 16, and the CCD converts the image light into a signal electric charge corresponding to the quantity of the image light. The signal electric charge is read as an image signal in accordance with a drive pulse transmitted from a CCD drive circuit (not shown). The number of pixels in the CCD should be selected according to desired image quality, and the CCD preferably has more than three hundred fifty thousand pixels. The imaging device is not restricted to the CCD, but it may be an imaging device such as a metal oxide semiconductor (MOS) type imaging device and a charge injection device (CID).

A slot 22 (equivalent to an information transmitting means and an information sending and receiving part) for receiving an external storage device 26 is formed at the right side of the first image-capturing unit 12 in FIG. 1. Two joint holes (equivalent to a connecting part) are formed vertically across the slot 22, and the first image-capturing unit 12 is connected to the second image-capturing unit 14 through the joint holes 24. Examples of the external storage device 26 are a PC card, a smart medium (an image memory card), a flash memory card and an IC card.

The second image-capturing unit 14 is provided with a taking lens 28, which is the same as the taking lens 16. As is the case with the first image-capturing unit 12, a CCD (not shown) is arranged behind the taking lens 28. A connector 30

(equivalent to the information transmitting means and a second information sending and receiving part) is provided at the left side of the second image-capturing unit 14, and two joints 32 (equivalent to a connecting means) are vertically arranged across the connector 30. The second image-capturing unit 14 can be detachably connected to the first image-capturing unit 12 through the connector 30 and the joints 32.

In the normal image-capturing, only the first image-capturing unit 12 is used as a single lens camera, and the external storage device 26 is attached to the slot 22. In a three-dimensional image-capturing or a panoramic image-capturing, the second image-capturing unit 14 is connected to the first image-capturing unit 12 to compose a multiple lens camera. More specifically, the joints 32 of the second image-capturing unit 14 are inserted into the joint holes 24 of the first image-capturing unit 12, and the connector 30 of the second image-capturing unit 14 is connected to the slot 22 of the first image-capturing unit 12, so that the first image-capturing unit 12 and the second image-capturing unit 14 can connect, and the two image-capturing optical systems are horizontally arranged side by side. Signals and data are transmitted between both image-capturing units through the slot 22, which is originally capable of receiving the external storage device 26, and the connector 30.

As is the case with the first image-capturing unit 12, a slot 34 (equivalent to a third information sending and receiving part) for receiving the external storage device 26 is provided at the right side of the second image-capturing unit 14, and two joint holes 36 (equivalent to a second connecting parts) are formed across the slot 34. This enables the second image-capturing unit 14 to further be connected to another image-capturing unit, which has the same connecting structure as the connector 30 and the joints 32. Thus, a plurality of units can be connected sequentially.

Figure 2:
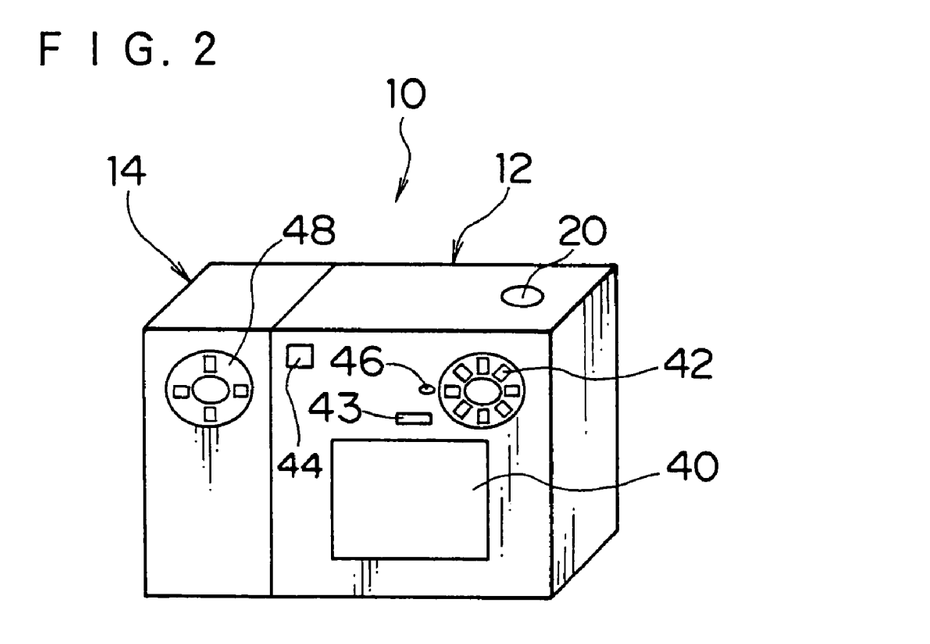
FIG. 2 is a perspective back view of the image-capturing apparatus in FIG. 1.

FIG. 2 is a back view of the first image-capturing unit 12 and the second image-capturing unit 14, which are connected to each other. A liquid crystal display (LCD) 40, a mode dial 42, a power switch 43, a finder eyepiece 44 are provided at the back of the first image-capturing unit 12.

The LCD 40 displays an image captured through the image-capturing optical systems, image information read from the external storage device 26 (not shown in FIG. 2), etc. For example, a 2-inch low temperature polysilicon LCD is used. Although not shown in detail, a parallax barrier display layer is formed on the surface of the LCD 40. In a stereo display mode, a parallax barrier is generated on the parallax barrier display layer, and the parallax barrier has a pattern in which light transmissible parts and light shielding parts are alternately arranged at predetermined pitches. Strip-shaped (narrow-rectangular) image fragments, which represent a plurality of images to be displayed, are alternately arranged and displayed on an image display surface under the parallax barrier display layer. If the image fragments represent a right-eye image and a left-eye image, a three-dimensional image can be displayed on the LCD 40. With this principle, an image can also be displayed so that it can look differently according to the viewing directions. For example, an image pattern is formed in such a way that image fragments A for the first display image, image fragments B for the second display image, and image fragments C for the third display image are arranged in order like A, B, C, A, B, C, A, B, C, . . .

The mode dial 42 is disposed at a position where the thumb of the hand holding the right part (a grip part) of the camera in FIG. 2 is naturally placed. The mode dial 42 is a control means for changing functions (modes) of the camera. For example, marks or characters indicating the following modes are formed at click stop positions along the circumference of the mode dial 42: "setup", "self-timer", "manual image-capturing", "automatic image-capturing", "reproduction", "erasure", "image protection" and "connection with personal computer". A mode is set by rotating the mode dial 42 clockwise or counterclockwise in FIG. 2 and setting the mark or the character indicating a desired mode to an index 46.

A cross key 48 is provided at the back of the second image-capturing unit 14. The cross key 48 is a control key, which is capable of tilting in four perpendicular directions. A concave is formed at the center of the cross key 48, and four marks indicating the four perpendicular directions are formed on a slope from the edge to the central part.

Pressing an area in proximity to one of the four marks tilts the cross key 48 to thereby input the corresponding direction (upper, lower, right or left). The cross key 48 is a means for correcting discordance between the image captured by the image-capturing optical system of the first image-capturing unit 12 and the image captured by the image-capturing optical system of the second image-capturing unit 14. Operating the cross key 48 enters a direction and a displacement amount for finely adjusting the position and the angle of the image, which is captured by the image-capturing optical system of the second image-capturing unit 14.

Figure 3:
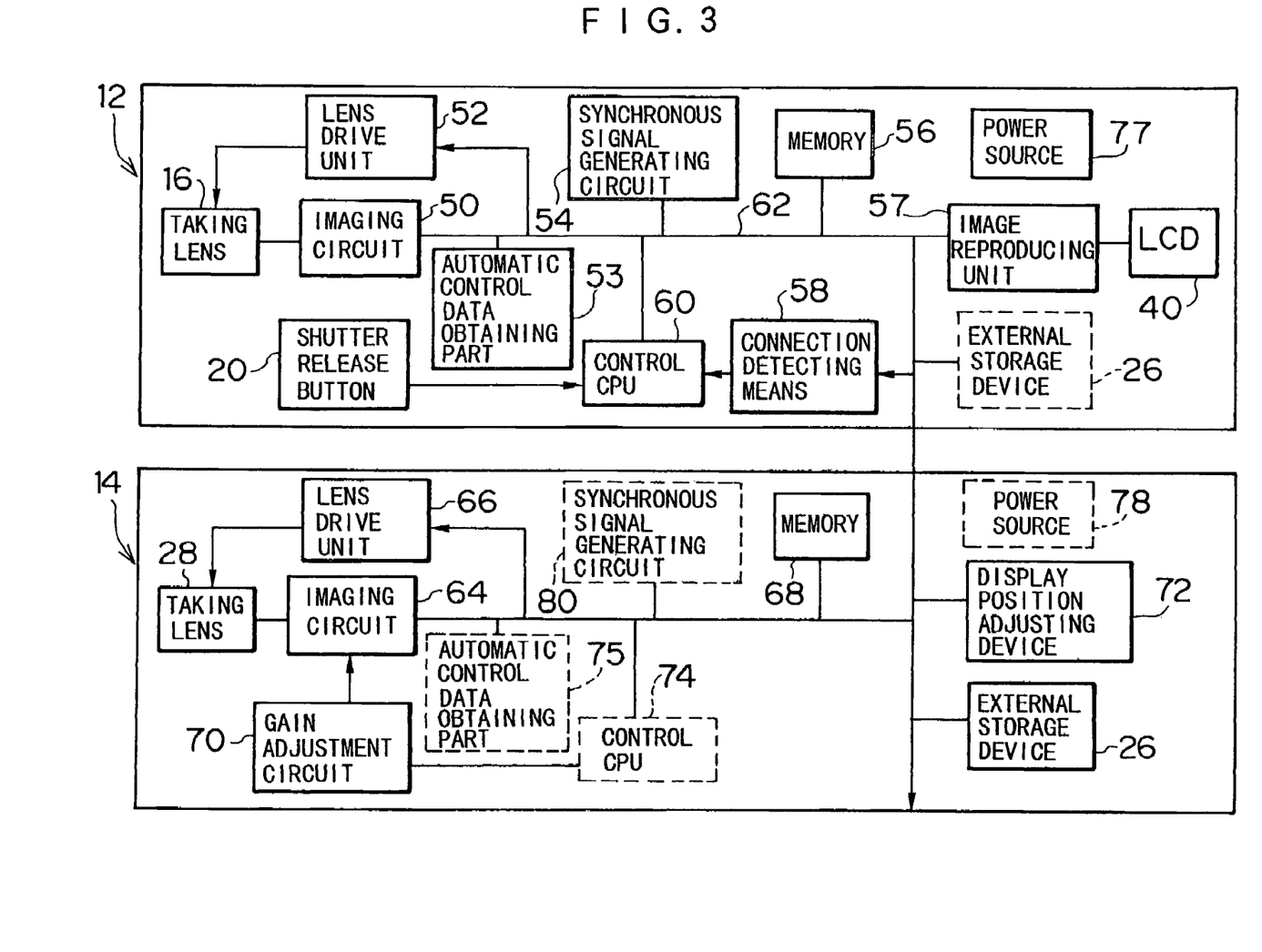
FIG. 3 is a block diagram showing the structure of the image-capturing apparatus in FIG. 1.

FIG. 3 is a block diagram showing the structure of the image-capturing apparatus according to the embodiment of the present invention. In FIG. 3, the upper section is the first image-capturing unit 12, and the lower section is the second image-capturing unit 14. The first image-capturing unit 12 comprises the taking lens 16, an imaging circuit 50, a lens drive unit 52, an automatic control data obtaining unit 53, a synchronous signal generating circuit 54, a memory 56, an image reproducing unit 57, a connection detecting means 58 and a control central processing unit (CPU) 60. The circuits are connected to one another through a bus 62.

As is the case with the first image-capturing unit 12, the second image-capturing unit 14 comprises the taking lens 28, an imaging circuit 64, a lens drive unit 66 and a memory 66. The second image-capturing unit 14 further comprises a gain adjustment circuit 70 for adjusting the gain of an image signal, and a display position adjusting device 72 for adjusting the position of the image captured by the two imaging systems.

Each of the imaging circuit 50 and 64 includes the CCD, a CDS circuit, a gain adjustment circuit, an A/D converter, etc. An image of a subject is formed on the light receiving surface of the CCD through the taking lenses 16 or 28, and the CCD photoelectrically converts the image, which is sequentially read as video signals. The CDS circuit sample-holds the video signals read from the CCD on a pixel-by-pixel basis, and a gain control amplifier amplifies the video signals. Then, the AID converter converts the video signals into dot-sequential RGB digital signals.

The automatic control data obtaining unit 53 includes an automatic exposure (AE) integration circuit, an automatic white balance (AWB) gain determining circuit, and an auto-focus (AF) value determining circuit. The automatic control data obtaining unit 53 determines a photometry value (AE value) in accordance with the image output signals (RGB digital signals) of one frame, which are inputted from the imaging circuit 50. The automatic control data obtaining unit 53 determines the levels of the RGB signals, and calculates a gain value (AWB value) in such a way as to equalize the levels of the RGB signals. The automatic control data obtaining unit 53 also determines a focus evaluation value indicating the sharpness of the subject's image in accordance with the image signals from the imaging circuit 50, and determines a focus position (AF value) with the focus evaluation value.

The AE value, the AWB value and the AF value are sent to the control CPU 60, and they are used for controlling the AE, the AWB and the AF.

The control CPU 60 supervises the circuits, and controls the circuits in accordance with a variety of signals inputted from the control parts such as the shutter release button 20 and the mode dial 42. More specifically, the control CPU 60 controls the exposure by setting a diaphragm and the electronic shutter values of the CCD of the imaging system in accordance with the AE value informed from the automatic control data obtaining unit 53. The control CPU 60 sets the white balance by controlling the gain control amplifier in accordance with the AWB value informed from the automatic control data obtaining unit 53. The control CPU 60 also controls the lens drive unit 52 in accordance with the AF value determined by the automatic control data obtaining unit 53 to thereby set the focusing position of the taking lens 16.

The control CPU 60 is also used as an image processing CPU, which processes the image signals outputted from the imaging circuit 50 in a processing area of the memory 56. For example, the control CPU 60 generates luminance (Y) signals and color difference (C) signals and expands/compresses the image data.

The image reproducing unit 57 decodes the image data processed according to the image signals read from the imaging circuits 50 and 64; the image data read from the external storage device 26; and so on. The image reproducing unit 57 supplies the decoded image data to the image display or the LCD 40. Thus, the image captured through the CCD is displayed on the screen of the LCD 40, and the image data stored in the external storage device 26 can be reproduced.

Before the control CPU 60 receives a release signal (an image-recording start signal) generated by pressing the shutter release button 20, etc., a preview image (a moving or intermittent image for confirmation, which is displayed before the image recording) is displayed on the LCD 40. Upon input of the image-recording start signal, the screen of the LCD 40 freezes. In response to the input of the image-recording start signal, the image signals read from the imaging circuits 50 and 64 are compressed as the need arises after a predetermined processing and are stored in the external storage device 26. The storage medium is not restricted to the detachable external storage device 26, but it may also be an internal memory built in the image-capturing units 12 or 14. The image-recording start signal may also be transmitted from the outside of the image-capturing apparatus 10 such as a remote control and external connection equipment. On completion of the above-mentioned recording process, the freezing state of the screen of the LCD 40 is cancelled, and the moving image or the intermittent image is displayed again.

The image data stored in the external storage device 26 can be read under the control of the control CPU 60. The read image data is expanded, and is outputted to the LCD 40 through the image reproducing unit 57.

The first image-capturing unit 12 has the connection detecting means 58, which detects the connection with the second image-capturing unit 14 at a contact point of the joint part and transmits a detection signal to the control CPU 60.

The synchronous signal generating circuit 54 transmits timing signals to the imaging circuit 50, the automatic control data obtaining unit 53, the image processing circuits, and so on, and also transmits synchronous signals for the signal processing to the second image-capturing unit 14.

The second image-capturing unit 14 controls the imaging circuit 64 and the lens drive unit 66 by a control CPU 74 in accordance with the AE, AWB and AF information obtained by the automatic control data obtaining unit 53 of the first image-capturing unit 12. The control CPU 74 controls the gain adjustment circuit 70 in such a way that the level of the video signal of the second image-capturing unit 14 is equal to the level of the video signal of the first image-capturing unit 12 in accordance with the information from the first image-capturing unit 12. It is possible to use the control CPU 60 of the first image-capturing unit 12 without providing the control CPU 74 of the second image-capturing unit 14.

Alternatively, the second image-capturing unit 14 may also be provided with an automatic control data obtaining unit 75 so that the automatic control data obtaining unit 75 can determine the AE, AWB, and AF according to the image signals outputted from the imaging circuit 64. If the second image-capturing unit 14 has the automatic control data obtaining unit 75, it is also possible to share the operation to obtain the automatic control data between the first and second image-capturing units 12 and 14. For example, the automatic control data obtaining unit 53 of the first image-capturing unit 12 determines the AE and the AWB, and the automatic control data obtaining unit 75 of the second image-capturing unit 14 determines the AF.

The display position adjusting device 72 is a means for correcting discordance between the imaging area of the imaging system of the first image-capturing unit 12 and the imaging area of the imaging system of the second image-capturing unit 14. The display position adjusting device 72 changes the output extraction area (position) of the CCD in the imaging circuit 64, and adjusts the display position of the second image-capturing unit 14 (the output extraction position of the CCD) so that the closest subject can overlap with each other on the image obtained through the two optical systems directed to the same subject. The second image-capturing unit 14 is provided with the means for correcting the discordance between two images for the reasons stated below. When the image-capturing optical system of the first image-capturing unit 12 and the image-capturing optical system of the second image-capturing unit 14 are united, it is difficult to completely make their images correspond to one another due to the error of the attachment position of each CCD, and so on.

More specifically, while the image obtained by the imaging system of the first image-capturing unit 12 and the image obtained by the imaging system of the second image-capturing unit 14 are displayed to overlap each other on the LCD 40, the image extraction position (area) and the angle of the imaging system of the second image-capturing unit 14 are adjusted by operating the cross key 48. The amount adjusted by the display position adjusting device 72 is stored in the memory 56 (or the internal memory of the control CPU 60) so as to maintain the adjusted state.

The first image-capturing unit 12 and the second image-capturing unit 14 may be provided with power sources 77 and 78, respectively. Alternatively, the power source 77 of the first image-capturing unit 12 can also be used to supply the second image-capturing unit 14 with the power without the power source 78.

FIG. 3 shows an example in which the two image-capturing units 12 and 14 are connected. As described above, there is no limitation on the number of units to be connected. In the image-capturing apparatus 10 composed of multiple image-capturing units, the second image-capturing unit 14 and the subsequent image-capturing units also record the images in synchronism with the release signal outputted from the first image-capturing unit 12. In the continuous image-recording mode, the image record timing of each image-capturing unit is offset by a predetermined time from the image record timing of the preceding image-capturing unit. The continuous image-capturing is performed with time lags between the units.

If a plurality of image-capturing units capture the image cooperatively, the synchronous signals outputted from the synchronous signal generating circuit 54 drive the circuits of the other image-capturing units. Alternatively, the second and the subsequent image-capturing units may be provided with synchronous signal generating circuits 80 so that the synchronous signals from the first image-capturing unit 12 can synchronize the synchronous signal generating circuits 80 of the second and the subsequent image-capturing units.

If zoom lenses are used for the taking lenses 16 and 28, the zoom control signals from the first image-capturing unit 12 are preferably supplied to the other image-capturing units to control zooming mechanisms so that the zooming magnifications of the image-capturing units 12 and 14 can be equal during the operation of a zoom control part (not shown) of the first image-capturing unit 12.

If a plurality of image-capturing units are connected, the amount of image data obtained by one image-recording differs according to the number of the connected units. For this reason, it is desirable to provide a means for automatically changing the number of possible shots, which is shown to the operator, in accordance with the number of connected image-capturing units and the available capacity of the memory in the external storage device 26.

Figure 4:
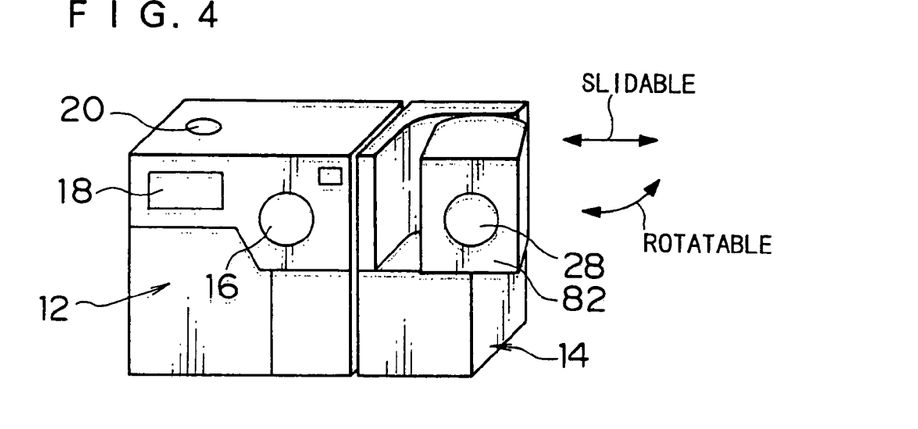
FIG. 4 is a perspective view showing another embodiment of the present invention.

FIG. 4 shows another embodiment of the image-capturing apparatus 10 in FIG. 1. As shown in FIG. 4, it is preferable to rotatably support a lens part (an imaging part) 82 of the second image-capturing unit 14 horizontally (and vertically as the need arises) and provide a means (equivalent to an optical axis angle changing means) for automatically setting the rotational angle of the lens part 82 according to the view angle of the lens 28. In this embodiment, the image processing means inside the camera or the image processing means outside the camera combines the images captured by the first and second image-capturing units 12 and 14 to thereby obtain a panoramic image.

Preferably, the lens part 82 of the second image-capturing unit 14 is slidable horizontally, and there is provided a means (equivalent to a lens interval changing means) for setting the interval between the lenses 16 and 18 of the first and second image-capturing units 12 and 14.

Figure 5:
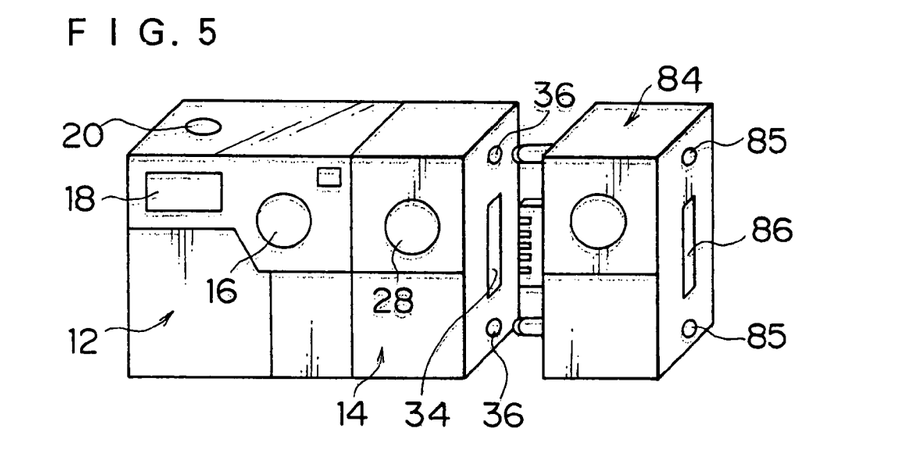
FIG. 5 is a perspective view showing an embodiment wherein three image-capturing units are connected.

As described with reference to FIG. 1, the joint holes 36 and the slot 34 are formed at the side of the second image-capturing unit 14 so that a third image-capturing unit 84 can be connected to the second image-capturing unit 14 as shown in FIG. 5. Two joint holes 85 and a slot 86, which are the same as the joint holes 36 and the slot 34, are formed in the third image-capturing unit 34 so that it can be connected to a fourth image-capturing unit (not shown). There is no limitation on the number of image-capturing units to be connected.

Figure 6:
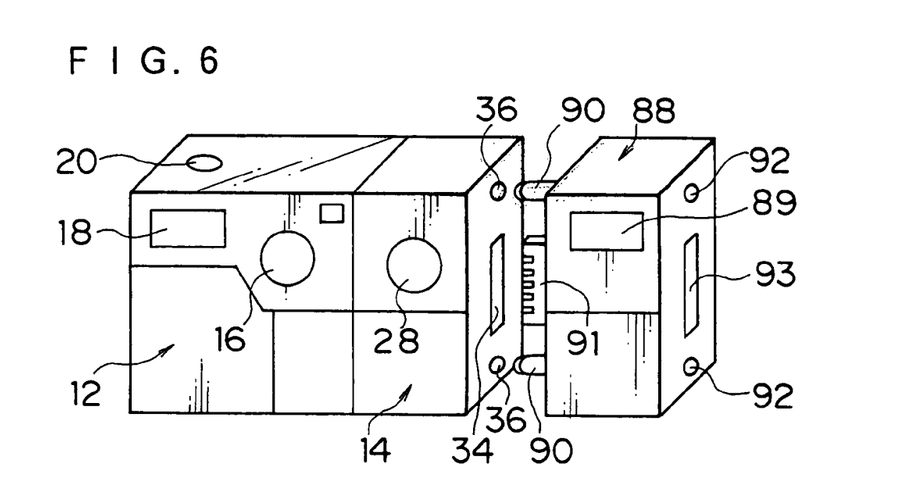
FIG. 6 is a perspective view showing the state wherein an electronic flash unit is connected instead of the image-capturing unit.

As shown in FIG. 6, it is also possible to connect an electronic flash unit 88, which does not include any imaging means, instead of the image-capturing unit including the imaging means. The electronic flash unit 88 has a light emitting part 89, two joints 90 and a connector 91, and the electronic flash unit 88 can be connected to the second image-capturing unit 14 or the first image-capturing unit 12. Two joint holes 92 and a slot 93, which are the same as the joint holes 36 and the slot 34, are formed in the electronic flash unit 88 so that it can be further connected to another unit. According to this structure, it is possible to omit the electronic flash 18 in the first image-capturing unit 12, and connect the electronic flash unit 88 as the need arises or provide an electronic flash in the second and the subsequent image-capturing units.

A description will now be given of the operation of the above-described image-capturing apparatus.

TABLE 1 shows a list of modes in the image-capturing apparatus according to the present embodiment.

TABLE 1

| Mode | | Operation |
|---|---|---|
| Single unit | | Normal image-capturing |
| Multiple units | Three dimensional | A plurality of image-capturing units capture images at the same time to obtain a plurality of images from different viewpoints. |
| | Panorama | The first and second image-capturing units capture images at the same time with the optical axis of the second image-capturing unit being inclined, thereby joining two images. |
| | Pan-focus | A plurality of image-capturing units capture images at the same time at different focuses to compose an image with a broad focusing area. |
| | Dynamic range expansion | A plurality of image-capturing units captures images at the same time under different exposure conditions to compose an image with a broad dynamic range. |
| | Special effects (extract depth information) | Depth information is extracted from images that are captured at the same time by a plurality of image-capturing units, and image processing such as gradation is performed according to the depth. |
| | Multi-zooming | A plurality of image-capturing units (lenses) capture images at the same time with different focal lengths (view angles). (A main subject is captured at a high resolution.) |
| | Continuous image-capturing | A plurality of image-capturing units are driven at preset time intervals to continuously capture images. |
| Recording | File merging | A sequence of related files are recorded as one image file. |
| | Separate file | Related files are separately recorded, and related file names are given to the related files. |
| Display | Single | A piece of image file data is displayed. |
| | Multiple | Multiple pieces of image file data are displayed side by side. |
| | Overlap | A plurality of overlapping semitransparent images are displayed. The image position is adjusted. |
| | Parallax barrier | A parallax barrier is formed on an image display layer to display a three-dimensional image. |
| Flashing | Single flashing | Only one flash lamp flashes. |
| | Simultaneous flashing | A plurality of flash lamps flash simultaneously. |

A description will be given of the functions of the image-capturing apparatus 10 with reference to TABLE 1.

The first image-capturing unit 12 can be separated from the second image-capturing unit so that it can be used as a normal camera. In this case, the external storage device 26 is mounted in the slot 22, and the captured image data is stored in the external storage device 26.

If the first image-capturing unit 12 is connected to one or more of image-capturing units such as the second image-capturing unit 14, the image-capturing apparatus 10 can be used in a variety of modes such as a three dimensional mode and a panoramic mode. In the three dimensional mode, two image-capturing units capture a right-eye image and a left-eye image at the same time to thereby obtain two images from different view points.

In the panoramic mode, the optical axis of the second image-capturing unit 14 is inclined to the outside with respect to the optical axis of the first image-capturing unit 12, and the first image-capturing unit 12 and the second image-capturing unit 14 capture two images at the same time. The two images are processed and joined to thereby obtain a panoramic image, which is long in the landscape orientation.

In the pan-focus mode, a plurality of image-capturing units capture images at different focus positions, and the focused areas of the images are combined to obtain an image, which is focused over the whole area of the image. In the dynamic range expansion mode, a plurality of image-capturing units capture images at the same time under different exposure conditions, and the data on the images are combined to compose one image with a broad dynamic range. In the special effect mode, the depth distribution information is extracted from images, which are captured at the same time by a plurality of image-capturing units. According to the depth values, the special effects such as the blurring are performed for an area (e.g., the background area), which is not at a specific distance, in order to emphasize the main subject.

In the multi-zoom mode, a plurality of image-capturing units (lenses) captures images at the same time with different focal lengths (view angles) thereof. In this mode, the main subject is imaged at a high magnification (telescopically), and the image data of the images are connected to one another so that the main subject can be enlarged and displayed with a high image quality at the reproduction. The image processing method in the pan-focus mode, the dynamic range expansion mode, the special effect mode and the multi-zoom mode is not only applied to the image-capturing apparatus 10 but it may also be applied in a variety of image processing techniques which process multiple pieces of image data. In the continuous image-capturing mode, a plurality of image-capturing units are driven one-by-one at predetermined time intervals as described previously.

The image data obtained in each image-capturing mode is recorded in one of the following two modes: the file merging mode and the separate file mode. In the file merging mode, a sequence of related files (image data files), which are obtained at the same time or continuously by a plurality of image-capturing units, is recorded as one image file.

In the separate file mode, the related files obtained by the image-capturing units are recorded separately, and related file names are automatically given to the related files. For example, "L" is added to a name of a data file for left-eye images, and "R" is added to a name of a data file for right-eye images.

Preferably, the file names that are given automatically in the file merging mode, and the file names that are given automatically in the separate file mode, belong to different types so that they can be distinguished at a first glance. The control CPU 60 manages the files.

To reproduce and display the image, it is possible to select one of the following four modes: the single mode, the multi-mode, the overlap mode and the parallax barrier mode. In the single mode, a piece of image file data is displayed on the screen of the LCD 40. In the multi-mode, a plurality of image files are arranged on the screen of the LCD 40. In the overlap mode, a plurality of semi-transparent images are displayed to overlap each other on the screen of the LCD 40. The operator can adjust the positions of the images by the display position adjusting device 72 while looking at the overlapping images.

In the parallax barrier mode, the parallax barrier is formed on the parallax barrier display layer of the LCD 40. And the image pattern, in which the strip-shaped image fragments of the left-eye images and the right-eye images are alternately arranged in conformity with the pitch of the parallax barrier, is displayed to display three-dimensional images.

The flash lamps flash in the single flashing mode or the simultaneous flashing mode. Only one flash lamp flashes in the single flashing mode, whereas a plurality of flash lamps flash in the simultaneous flashing mode.

In addition to the modes shown in FIG. 7, the image-capturing apparatus 10 has functions as described below.

It is possible to add a means for prohibiting the image-capturing or recording of any image-capturing unit to selectively use desired image-capturing units. In this case, the power for the unused image-capturing is preferably shut off to prevent the waste of power.

It is possible to provide a file management means for joining multiple pieces of image data, which are captured with time lags in the single lens mode, to thereby obtain one image file, or the multiple pieces of image data are separately stored in a plurality of image files with related file names.

In the image-capturing apparatus 10 stated above, a non-contact communication means (a wireless communication means), which uses electromagnetic waves such as infrared rays and radio waves in order to transmit the data between the first image-capturing unit 12 and the subsequent image-capturing units. Consequently, the separated image-capturing units can capture the images at the same time.

In these embodiments, the LCD is used as the image display, but an electroluminescence (EL) display, a light emitting diode (LED) display, a plasma display, or the like may also be used as the image display.

In the above description, the apparatus (the electronic camera) converts the image light representing the subject into electric signals by the imaging device such as the CCD to thereby obtain the electronic image. The present invention may also be applied to an image-capturing apparatus, which uses a camera (a silver halide camera) for recording the image light on a photosensitive material such as photographic film. The present invention may be applied not only to the apparatus that captures still images but also to the apparatus that captures moving images.

As set forth hereinabove, the image-capturing apparatus of the present invention modularizes the image-capturing units provided with the image-capturing optical systems. The first image-capturing unit, which is capable of functioning as the normal image-capturing apparatus, is connected to a plurality of image-capturing units as the need arises. Therefore, the image-capturing apparatus of the present invention is portable when it is used as the normal single lens camera. Moreover, the image-capturing units can easily be connected to the first image-capturing unit to expand the functions so that the image-capturing apparatus can be used as the multiple lens camera. This eliminates the waste in the structure of the image-capturing apparatus.

In particular, a plurality of image-capturing units are synchronously driven to easily obtain a sequence of related images. It is therefore possible to easily obtain the three-dimensional image and the panoramic image. Moreover, it is possible to obtain the depth information from the multiple pieces of image data to perform the special effects such as the blurring of the background.

In addition, there is provided the means for correcting the discordance between the optical systems of the connected image-capturing units in order to obtain the high-quality three-dimensional image and panoramic image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image-capturing apparatus comprising a first image-capturing unit having a first image-capturing optical system; wherein
the first image-capturing unit comprises:
a first joint part and a first information transmitting part capable of integrally expanding and connecting to a second image-capturing unit having a second image-capturing optical system;
a first connection detector for detecting connection to the second image-capturing unit; and
a controller for causing the first image-capturing unit to perform image-capturing, playback, image-recording, if the first connection detector does not detect connection to the second image-capturing unit, and for operating the first image-capturing unit and the second image-capturing unit so that the first image-capturing unit and the second image-capturing unit are synchronized or interlocked one another, if the first connection detector detects connection to the second image-capturing unit.

2. An image-capturing apparatus comprising a first image-capturing unit having a first image-capturing optical system; wherein
the first image-capturing unit comprises:
a first joint part and a first information transmitting part capable of integrally expanding and connecting to a second image-capturing unit having a second image-capturing optical system;
a first connection detector for detecting connection to the second image-capturing unit; and
a controller for enabling only an image-capturing unit of the first image-capturing unit and the second image-capturing unit to be selectively used, if the first connection detector detects connection to the second image-capturing unit.

3. The image-capturing apparatus as defined in claim 1, wherein the first joint part and the first information transmitting part of the first image-capturing unit has a structure capable of integrally expanding and connecting the second image-capturing unit in a horizontal direction.

4. The image-capturing apparatus as defined in claim 2, wherein the first joint part and the first information transmitting part of the first image-capturing unit has a structure capable of integrally expanding and connecting the second image-capturing unit in a horizontal direction.

5. The image-capturing apparatus as defined in claim 1, wherein the image-capturing apparatus further comprises the second image-capturing unit, and the second image-capturing unit further capable of being directly and detachably attached to a third image-capturing unit having a third image-capturing optical system and adapted to be capable of connecting a plurality of image-capturing units in order.

6. The image-capturing apparatus as defined in claim 2, wherein the image-capturing apparatus further comprises the second image-capturing unit, and the second image-capturing unit further capable of being directly and detachably attached to a third image-capturing unit having a third image-capturing optical system and adapted to be capable of connecting a plurality of image-capturing units in order.

7. The image-capturing apparatus as defined in claim 5, wherein
the first connection detector detects that at least the third image-capturing unit is connected to the second image-capturing unit;
the second image-capturing unit has a second joint part and a second information transmitting part capable of expanding and connecting integrally to the third image-capturing unit; and
the controller synchronizes or interlocks image-capturing operation of a plurality of image-capturing units.

8. The image-capturing apparatus as defined in claim 6, wherein
the first connection detector detects that the second image-capturing unit is connected to at least the third image-capturing unit;
the second image-capturing unit has a second joint part and a second information transmitting part capable of expanding and connecting integrally to the third image-capturing unit; and
the controller enables only an image-capturing unit in a plurality of image-capturing units to be selectively used.

9. The image-capturing apparatus as defined in claim 1, further Comprising at least one of:
a lens interval changer for adjusting an interval between the first and second image-capturing optical systems; and
an optical axis angle changer for adjusting an angle of an optical axis of the second image-capturing optical system with respect to an optical axis of the first image-capturing optical system.

10. The image-capturing apparatus as defined in claim 2, further comprising at least one of:
a lens interval changer for adjusting an interval between the first and second image-capturing optical systems; and
an optical axis angle changer for adjusting an angle of an optical axis of the second image-capturing optical system with respect to an optical axis of the first image-capturing optical system.

11. The image-capturing apparatus as defined in claim 1, wherein each of the first and second-capturing units has a power source.

12. The image-capturing apparatus as defined in claim 2, wherein each of the first and second-capturing units has a power source.

13. The image-capturing apparatus as defined in claim 1, further comprising:
a power supplying device for supplying power from a power source of the first image-capturing unit to at least the second image-capturing unit.

14. The image-capturing apparatus as defined in claim 2, further comprising:
a power supplying device for supplying power from a power source of the first image-capturing unit to at least the second image-capturing unit.

15. The image-capturing apparatus as defined in claim 1, wherein each of the first and second image-capturing units comprises an imaging device for converting a light from a subject into an electric signal, and captures an image as an electronic image.

16. The image-capturing apparatus as defined in claim 2, wherein each of the first and second image-capturing units comprises an imaging device for converting a light from a subject into an electric signal, and captures an image as an electronic image.

17. The image-capturing apparatus as defined in claim 15, further comprising:
an image-position adjuster for adjusting a position of an image captured by the second image-capturing unit with respect to a position of an image captured by the first image-capturing unit.

18. The image-capturing apparatus as defined in claim 16, further comprising:
an image-position adjuster for adjusting a position of an image captured by the second image-capturing unit with respect to a position of an image captured by the first image-capturing unit.

19. The image-capturing apparatus as defined in claim 15, wherein the first image-capturing unit further comprises:
an image display; and
an adjusting device for displaying, on the image display, the image captured by the first image-capturing optical system and the image captured by the second image-capturing optical system to overlap one another, the adjusting device adjusting an image extracting position and/or an image extracting angle of the second image-capturing optical system.

20. The image-capturing apparatus as defined in claim 16, wherein the first image-capturing unit further comprises:
an image display; and
an adjusting device for displaying, on the image display, the image captured by the first image-capturing optical system and the image captured by the second image-capturing optical system to overlap one another, the adjusting device adjusting an image extracting position and/or an image extracting angle of the second image-capturing optical system.

21. The image-capturing apparatus as defined in claim 19, further comprising:
a storage device for storing an amount adjusted by the adjusting device.

22. The image-capturing apparatus as defined in claim 20, further comprising:
a storage device for storing an amount adjusted by the adjusting device.

23. The image-capturing apparatus as defined in claim 15, wherein the first image-capturing unit comprises:
an image display; and
an optical axis adjusting device for displaying, on the image display, the image captured by the first image-capturing optical system and the image captured by the second image-capturing optical system to overlap one another, the optical axis adjusting device adjusting a direction of a lens optical axis of the second image-capturing optical system.

24. The image-capturing apparatus as defined in claim 16, wherein the first image-capturing unit comprises:
an image display; and
an optical axis adjusting device for displaying, on the image display, the image captured by the first image-capturing optical system and the image captured by the second image-capturing optical system to overlap one another, the optical axis adjusting device adjusting a direction of a lens optical axis of the second image-capturing optical system.

25. The image-capturing apparatus as defined in claim 5, wherein the second image-capturing unit records an image at the same time as the first image-capturing unit does in synchronism with an image-recording start signal outputted from the first image-capturing unit.

26. The image-capturing apparatus as defined in claim 6, wherein the second image-capturing unit records an image at the same time as the first image-capturing unit does in synchronism with an image-recording start signal outputted from the first image-capturing unit.

27. The image-capturing apparatus as defined in claim 5, wherein an image capture timing of the second image-capturing unit is offset from a reference image capture timing of the first image-capturing unit by a predetermined time to thereby continuously capture images with the first and second image-capturing units.

28. The image-capturing apparatus as defined in claim 6, wherein an image capture timing of the second image-capturing unit is offset from a reference image capture timing of the first image-capturing unit by a predetermined time to thereby continuously capture images with the first and second image-capturing units.

29. The image-capturing apparatus as defined in claim 1, wherein the first image-capturing unit comprises at least one of:
an AE device for measuring an AE value for controlling automatic exposure;
an AWB device for measuring an AWB value for automatically controlling white balance; and
an AF device for measuring an AF value for automatically controlling a focal point;
wherein the first image-capturing unit automatically controls at least one of the exposure, the white balance and the focal point for another image-capturing unit in accordance with said at least one of the AE value, the AWB value and the AF value obtained by the first image-capturing unit.

30. The image-capturing apparatus as defined in claim 2, wherein the first image-capturing unit comprises at least one of:
an AE device for measuring an AE value for controlling automatic exposure;
an AWB device for measuring an AWB value for automatically controlling white balance; and
an AF device for measuring an AF value for automatically controlling a focal point;
wherein the first image-capturing unit automatically controls at least one of the exposure, the white balance and the focal point for another image-capturing unit in accordance with said at least one of the AE value, the AWB value and the AF value obtained by the first image-capturing unit.

31. The image-capturing apparatus as defined in claim 29, wherein the second image-capturing unit comprises at least one of:
an AE device for measuring an AE value for controlling automatic exposure;
an AWB device for measuring an AWB value for automatically controlling white balance; and
an AF device for measuring an AF value for automatically controlling a focal point;
wherein the first image-capturing unit and the second image-capturing unit share measuring operations and measured results.

32. The image-capturing apparatus as defined in claim 30, wherein the second image-capturing unit comprises at least one of:
an AE device for measuring an AE value for controlling automatic exposure;
an AWB device for measuring an AWB value for automatically controlling white balance; and
an AF device for measuring an AF value for automatically controlling a focal point;
wherein the first image-capturing unit and the second image-capturing unit share measuring operations and measured results.

33. The image-capturing apparatus as defined in claim 1, wherein:
the image-capturing optical system of each image-capturing unit comprises a zoom lens; and the image-capturing apparatus further comprises a lens controller for driving the zoom lens of each image-capturing unit to equalize zooming magnifications of the second image-capturing optical systems.

34. The image-capturing apparatus as defined in claim 2, wherein:
the image-capturing optical system of each image-capturing unit comprises a zoom lens; and
the image-capturing apparatus further comprises a lens controller for driving the zoom lens of each image-capturing unit to equalize zooming magnifications of the second image-capturing optical systems.

35. The image-capturing apparatus as defined in claim 15, wherein
a gain adjuster for adjusting a gain of a video signal to equalize a video signal level of the second image-capturing unit to a video signal level of the first image-capturing unit is provided for the second image-capturing unit.

36. The image-capturing apparatus as defined in claim 16, wherein
a gain adjuster for adjusting a gain of a video signal to equalize a video signal level of the second image-capturing unit to a video signal level of the first image-capturing unit is provided for the second image-capturing unit.

37. The image-capturing apparatus as defined in claim 15, further comprising:
an image display having a parallax barrier display layer on a display plane, the parallax barrier display layer displaying a parallax barrier having a pattern in which light transmissible parts and light shielding parts are arranged alternately; and
a signal processor for displaying an image pattern in which strip-shaped image fragments representing a left-eye image and a right-eye image are arranged alternately, or an image pattern in which strip-shaped image fragments representing a plurality of images are arranged in order in association with a pitch of a parallax barrier appearing on the parallax barrier display layer;
wherein an image capable of being seen three-dimensionally or an image capable of being seen differently according to viewing directions is displayed.

38. The image-capturing apparatus as defined in claim 16, further comprising:
an image display having a parallax barrier display layer on a display plane, the parallax barrier display layer displaying a parallax barrier having a pattern in which light transmissible parts and light shielding parts are arranged alternately; and
a signal processor for displaying an image pattern in which strip-shaped image fragments representing a left-eye image and a right-eye image are arranged alternately, or an image pattern in which strip-shaped image fragments representing a plurality of images are arranged in order in association with a pitch of a parallax barrier appearing on the parallax barrier display layer;
wherein an image capable of being seen three-dimensionally or an image capable of being seen differently according to viewing directions is displayed.

39. The image-capturing apparatus as defined in claim 15, wherein the first and second image-capturing units capture images at different focal positions, and focused areas in the images are combined to compose an image that is focused over the whole image.

40. The image-capturing apparatus as defined in claim 16, wherein the first and second image-capturing units capture images at different focal positions, and focused areas in the images are combined to compose an image that is focused over the whole image.

41. The image-capturing apparatus as defined in claim 15, wherein depth distribution information is extracted from the images captured by the first and second image-capturing units to perform special effects such as blurring for areas that are not at a predetermined image-capturing distance.

42. The image-capturing apparatus as defined in claim 16, wherein depth distribution information is extracted from the images captured by the first and second image-capturing units to perform special effects such as blurring for areas that are not at a predetermined image-capturing distance.

43. The image-capturing apparatus as defined in claim 15, further comprising: a shot number display for displaying a number of possible shots according to a number of connected image-capturing units.

44. The image-capturing apparatus as defined in claim 16, further comprising: a shot number display for displaying a number of possible shots according to a number of connected image-capturing units.

45. The image-capturing apparatus as defined in claim 15, further comprising: a file manager for recording a sequence of image data, captured by the first and second image-capturing units simultaneously or continuously, in an image file and automatically giving a file name to the image file, the file name being easily distinguishable from a file name of an image file in which one piece of image data is recorded.

46. The image-capturing apparatus as defined in claim 16, further comprising: a file manager for recording a sequence of image data, captured by the first and second image-capturing units simultaneously or continuously, in an image file and automatically giving a file name to the image file, the file name being easily distinguishable from a file name of an image file in which one piece of image data is recorded.

47. The image-capturing apparatus as defined in claim 15, further comprising: a file manager for recording a sequence of image data, captured by the first and second image-capturing units simultaneously or continuously, in separate image files and automatically giving file names to the separate image files, the file names indicating that the separate image files are related to one another.

48. The image-capturing apparatus as defined in claim 16, further comprising: a file manager for recording a sequence of image data, captured by the first and second image-capturing units simultaneously or continuously, in separate image files and automatically giving file names to the separate image files, the file names indicating that the separate image files are related to one another.

49. The image-capturing apparatus as defined in claim 1, wherein a non-contact communication device using electromagnetic waves including lights is provided for at least two image-capturing units so that the electromagnetic waves transmits information between the image-capturing units.

50. The image-capturing apparatus as defined in claim 2, wherein a non-contact communication device using electromagnetic waves including lights is provided for at least two image-capturing units so that the electromagnetic waves transmits information between the image-capturing units.

51. The image-capturing apparatus as defined in claim 1, wherein the first image-capturing unit has an image display, and the image captured by the second image-capturing unit is displayed on the image display of the first image-capturing unit.

52. The image-capturing apparatus as defined in claim 2, wherein the first image-capturing unit has an image display, and the image captured by the second image-capturing unit is displayed on the image display of the first image-capturing unit.

53. The image-capturing apparatus as defined in claim 1, wherein the first image-capturing unit has an image display, and the image recorded in the storage device of the second image-capturing unit is displayed on the image display of the first image-capturing unit.

54. The image-capturing apparatus as defined in claim 2, wherein the first image-capturing unit has an image display, and the image recorded in the storage device of the second image-capturing unit is displayed on the image display of the first image-capturing unit.

55. The image-capturing apparatus as defined in claim 49, wherein a slot for an external storage device to which an external storage device is detached and attached is shared for the first information transmitting part.

56. The image-capturing apparatus as defined in claim 50, wherein a slot for an external storage device to which an external storage device is detached and attached is shared for the first information transmitting part.

57. A digital camera comprising an image-capturing device as defined in claim 49.

58. A digital camera comprising an image-capturing device as defined in claim 50.

59. An electronic flash unit capable of being detachably attached to the electronic camera of claim 57, the electronic flash unit flashing in response to an image-recording start signal outputted from the first image-capturing unit.

60. An electronic flash unit capable of being detachably attached to the electronic camera of claim 58, the electronic flash unit flashing in response to an image-recording start signal outputted from the first image-capturing unit.

* * * * *